(12) United States Patent
De Petra et al.

(10) Patent No.: US 9,565,965 B2
(45) Date of Patent: Feb. 14, 2017

(54) KETTLE

(75) Inventors: Andy De Petra, Spearwood (AU); Edward Joseph Khoury, Bateman (AU)

(73) Assignee: NANGALA PTY LTD, Fremantle, Western Australia (AU)

(*) Notice: Subject to any disclaimer, the term of this patent is extended or adjusted under 35 U.S.C. 154(b) by 205 days.

(21) Appl. No.: 14/342,320

(22) PCT Filed: Aug. 29, 2012

(86) PCT No.: PCT/AU2012/001005
§ 371 (c)(1),
(2), (4) Date: Feb. 28, 2014

(87) PCT Pub. No.: WO2013/029096
PCT Pub. Date: Mar. 7, 2013

(65) Prior Publication Data
US 2014/0203009 A1    Jul. 24, 2014

(30) Foreign Application Priority Data
Aug. 30, 2011   (AU) ................................ 2011903480

(51) Int. Cl.
*F27D 11/00*    (2006.01)
*A47J 27/21*    (2006.01)

(52) U.S. Cl.
CPC ..... *A47J 27/21166* (2013.01); *A47J 27/21025* (2013.01)

(58) Field of Classification Search
CPC ..................... A47J 27/21061; A47J 27/21166; A47J 27/2105; A47J 27/21016; A47J 27/21025; A47J 27/21041; A47J 27/21066; A47J 27/21191; A47J 27/21008; A47J 2019/122
See application file for complete search history.

(56) References Cited

U.S. PATENT DOCUMENTS

| 3,155,284 A | * | 11/1964 | Forman et al. | ........ A47G 19/14 222/144 |
| 2012/0091119 A1 | * | 4/2012 | Lim | .................. A47J 27/21016 219/431 |

* cited by examiner

*Primary Examiner* — Shawntina Fuqua
(74) *Attorney, Agent, or Firm* — Tope-McKay & Associates

(57) ABSTRACT

A kettle comprising a base and a frame pivotally mounted relative to the base. The frame includes first electrical contacts connectable to a power source and a vessel is receivable in and removable from the frame. The vessel includes an internal element in connection with second electrical contacts and an opening from which liquid can be poured. When the vessel is received in the frame the first electrical contacts make connection with the second electrical contacts such that power is supplied to the internal element to heat water within the vessel. Pivoting of the vessel and frame relative to the base allows pouring of liquid, from the opening.

21 Claims, 8 Drawing Sheets

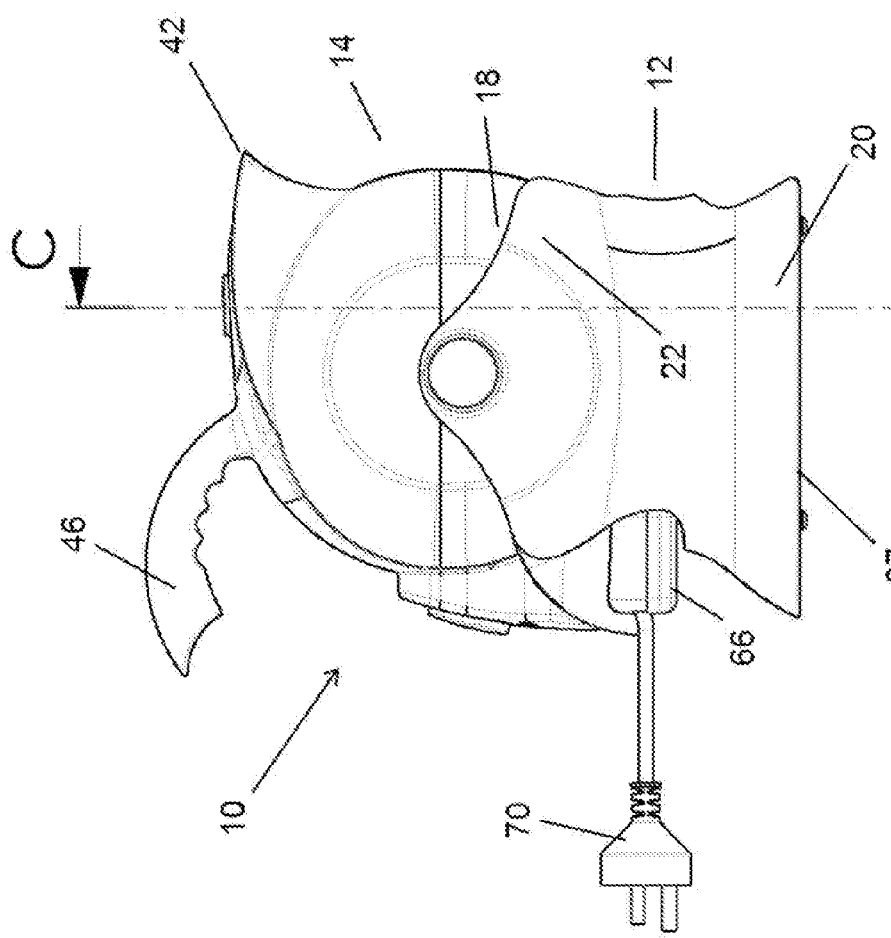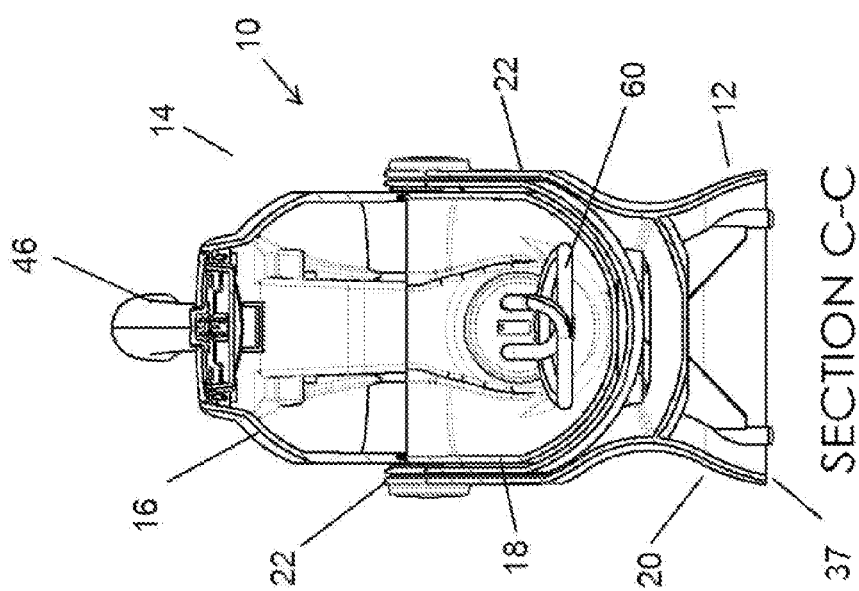

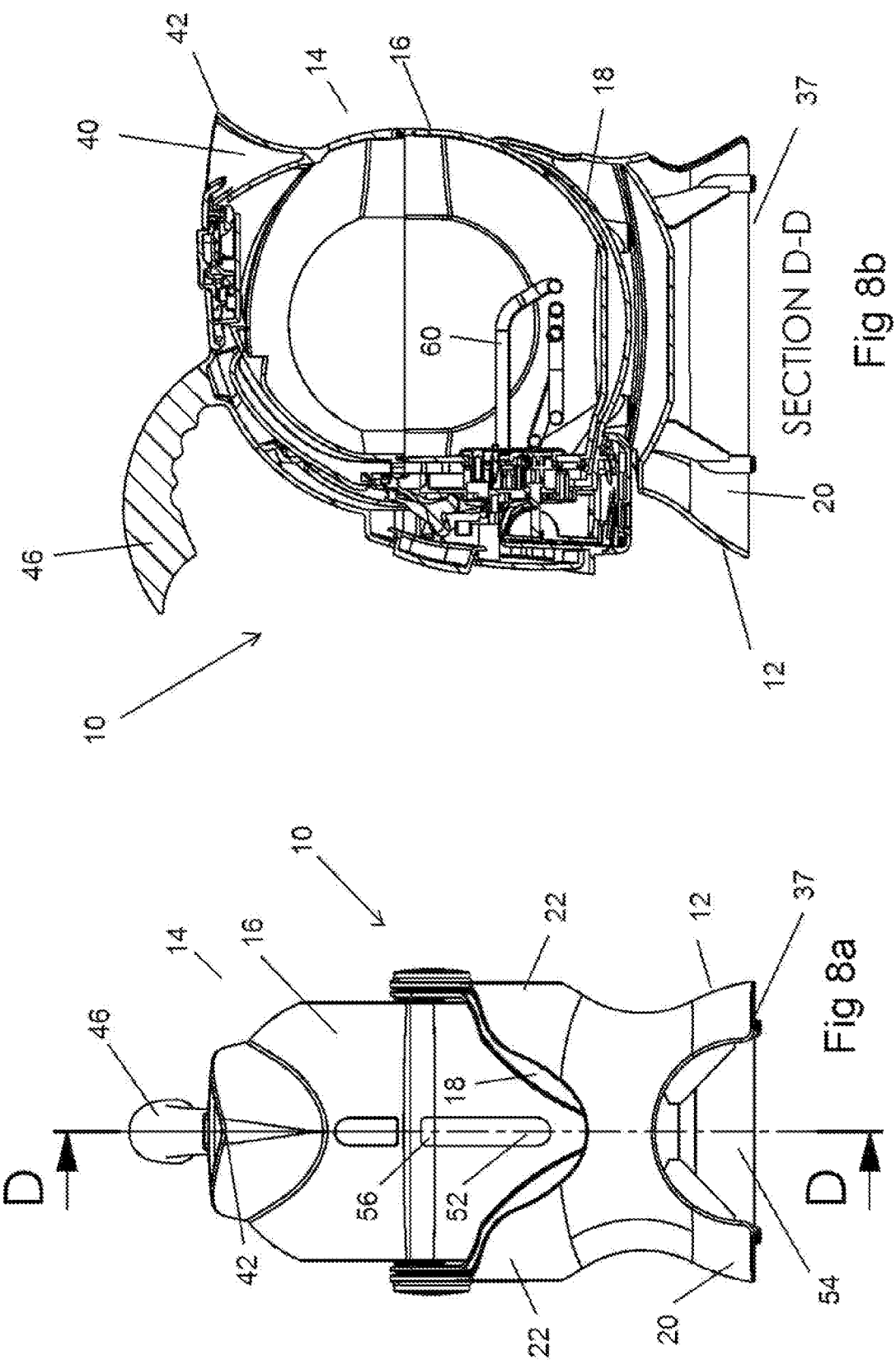

KETTLE

BACKGROUND (1) Field of Invention

The present invention relates to a kettle for heating liquid, and more particularly to a kettle containing a heating element pivotally mounted in a base which can be pivoted to allow pouring of the liquid the kettle contains.

(2) Description of Related Art

Kettles generally have a handle on the side or on the top used to hold the kettle for pouring water. Grasping such a handle can be difficult tor some people, such as those suffering arthritis in the hand and finger joints. This can make the process of holding and pouring a kettle full of hot water a difficult task.

Thus a continuing need exists for a kettle having an improved design aimed at making the process of pouring water from the kettle and filling the kettle easier.

SUMMARY

In one aspect, the present invention comprises a kettle having a base with a frame pivotally mounted relative to the base. The frame includes first electrical contacts connectable to a power source. A vessel is receivable in and is removable from the frame, the vessel including an internal element in connection with second electrical contacts. The vessel has an opening from which liquid can be poured. Thus, when the vessel is received in the frame the first electrical contacts make connection with the second electrical contacts such that power is supplied to the internal element to heat water within the vessel and pivoting of the vessel and frame relative to the base allows pouring of liquid from the opening.

In another aspect, the vessel is removable from the frame by lifting the vessel upwardly. Preferably the base includes a pair of support members extending upwardly from a lower portion thereof, the support members being engaged with opposed sides of the frame such that the frame is rotatable about the base about a horizontal axis of rotation.

In yet another aspect, each support member includes a recess on a side thereof adjacent the other support member and the frame includes a pair of cylindrical protrusions on opposite sides thereof such that the cylindrical protrusions are received in the recesses in the support members.

In still another aspect, the cylindrical protrusions each include a peripheral rim to engage in a snap fit manner with lugs within the recesses to retain the protrusions within the recesses such that the cylindrical protrusions are rotatable with in the recesses.

In a still further aspect, side surfaces of die vessel include lugs that are received downwardly into slots provided on opposed inner surfaces of the frame such that the vessel can be inserted downwardly into the frame.

In a yet further aspect, the slots may be located on the frame such that when the lugs are received in the slots, the lugs are located generally on the axis of rotation.

In a further aspect, the vessel comprises a curved wall defining an internal chamber into which water is received for heating and the frame is provided in a shape that is complementary in shape to the lower half of the vessel such that a portion of the vessel is received in the frame. In one embodiment, the shape of the curved wall is generally an oblate spheroid having a central symmetry axis located generally on the axis of rotation.

In another aspect, the lower portion of the base comprises generally a dome shaped member having a lower edge that rests on a horizontal surface and the support members extend upwardly from the lower portion and each comprise a curved wall member. Preferably the lower edge includes a cut out portion below the opening such that the lower edge is located above the surface on which the base is resting to provide an opening into which an edge of a saucer can be received.

In yet another aspect, the opening is provided adjacent a centre line of the vessel, the centre line being a line around the vessel on a plane perpendicular to the rotation axis midway between the lugs. The opening is preferably provided with a spout such that when the vessel is rotated about the rotation axis, the spout aids the pouring of water downwardly into a mug or cup located adjacent the base.

In still another aspect, the spout comprises a first side wall located on one side of the centre line and a second side wall located on an opposite side of the centre line, the first and second walls meeting at the centre line on a side of the opening and tapering downwardly in height as the walls extend away from each oilier along each side of the opening.

In a still further aspect, the vessel is provided with a handle extending outwardly from the vessel on the centre line of the body on a side of the opening opposite the spout. The handle is preferably curved in shape, curving away from a radial line extending from the rotational axis.

In a yet further aspect, the first electrical contact is provided in a first electrical housing on the frame and the second electrical contact is provided in a second electrical housing on the vessel. Preferably the first electrical housing includes a projecting portion which is arranged to be received in an opening in the second electrical housing when the vessel is received in the frame such that the first electrical contacts engage with the second contacts.

In a further aspect, the vessel preferably includes a transparent window such that the level of water within the vessel can be viewed. The window may be provided under the spout along the centre line.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7a is a side view of the kettle of FIG. 1;

FIG. 7b is a front cross sectional view of the kettle of FIG. 7a through the line C-C;

FIG. 8a is a front view of the kettle of FIG. 1; and

FIG. 8b is a side cross sectional view of the kettle of FIG. 8a through the line D-D.

DETAILED DESCRIPTION

Figure 1:
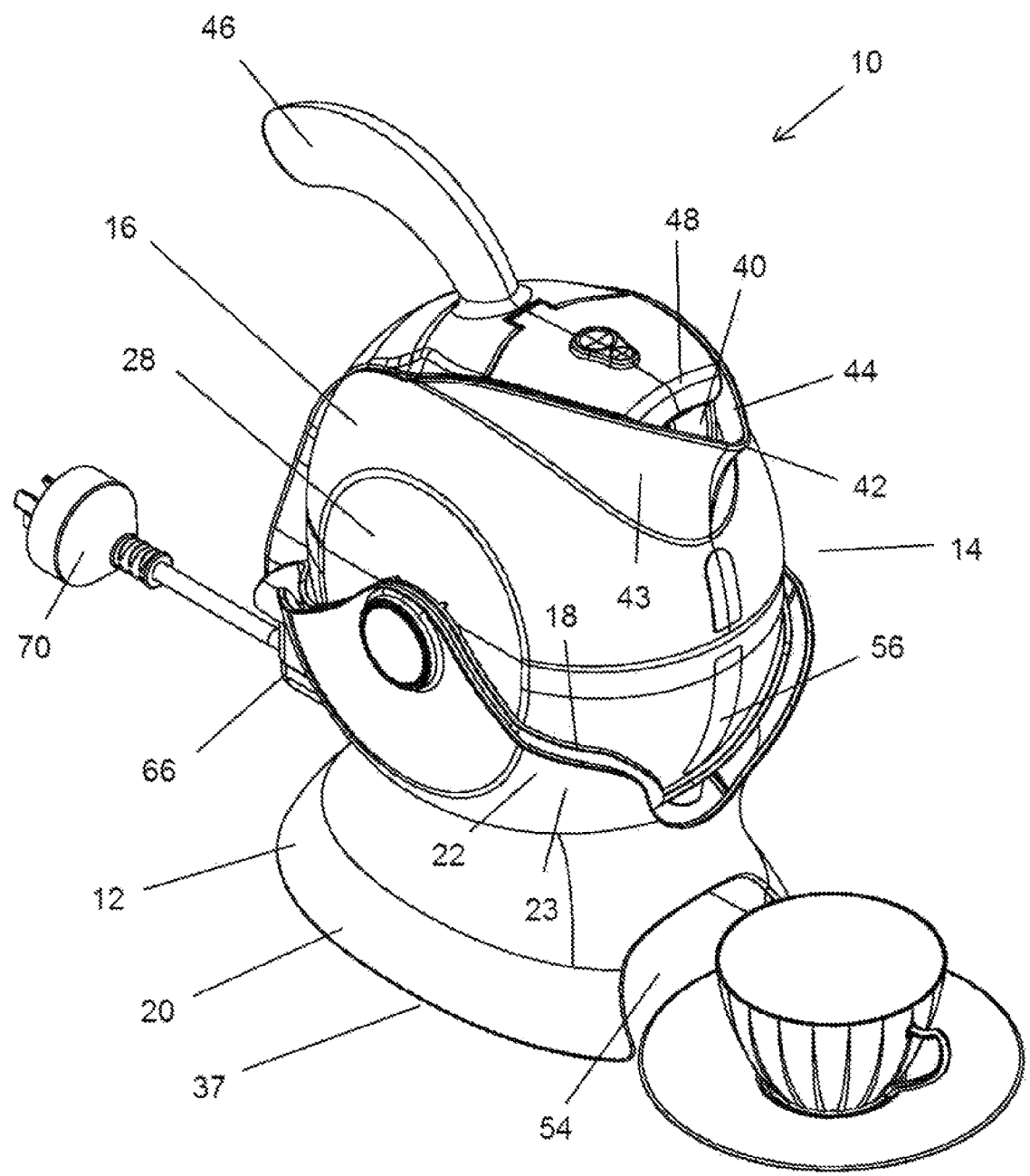
FIG. 1 is an upper perspective view of a kettle in accordance with the present invention.

The present invention relates to a kettle for heating liquid, and more particularly to a kettle containing a heating element, pivotally mounted in a base which can be pivoted to allow pouring of the liquid the kettle contains. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Referring now to the figures, there is shown a kettle 10 comprising a base 12 and a body 14. The body 14 comprises a vessel 16 and a frame 18 such that the vessel 16 is provided for receiving water to be heated and the vessel 16 is received within the frame 18. The frame 18 is received into the base 12.

The base 12 is provided to be placed on a surface, such as a kitchen bench top, and the body 14 is secured to the base 12. The base 12 comprises a lower portion 20 provided to rest on a horizontal surface and a pair of support members 22 extending upwardly from the lower portion 20. The support members 22 are provided such that the body 14 of the kettle 10 can be received between and supported by the support members 22.

The support members 22 each include a recess 24 on a side thereof adjacent the other support member 22, The frame 18 of the kettle 10 includes a pair of cylindrical protrusions 26 on opposite sides thereof such that the cylindrical protrusions 26 are received in the recesses 24 in the support members 22. The cylindrical protrusions 26 each include a peripheral rim 36. The rims 36 engage in a snap fit manner with lugs 38 within the recesses 24 to retain the protrusions 26 within the recesses 24. The cylindrical protrusions 26 are rotatable within the recesses 26 such that the frame 18 may pivot relative to the support members 22. The body 14 can therefore be pivoted about the cylindrical protrusions 26 about an axis 50 passing through the recesses 24 in the support members 22. The axis 50 about which the body 14 rotates is generally horizontal.

The vessel 16 comprises a curved wall defining an internal chamber into which water is received for heating. The shape of the curved wall is generally an oblate spheroid. That is, a spherical shape that is slightly flattened on opposed side surfaces 28 thereof, the side surfaces 28 being those adjacent the support members 22 in use. The central symmetry axis of the spheroid is located generally on the axis 50 of rotation. The vessel 16 therefore pivots generally about a central horizontal axis.

The frame 18 is provided in a shape that is complementary in shape to the lower half of the vessel 16 such that a portion of the vessel 16 is received in the frame 18. The side surfaces 28 of the vessel 16 include logs 30 that are received downwardly into slots 32 provided on opposed inner surfaces of the frame 18. Each of the slots 32 are provided adjacent one of the cylindrical protrusions 26 on the frame 18 such that when the lugs 30 are received in the slots 32, the lugs 30 are located generally on the axis 50 about which the body 14 rotates.

The vessel 16 is provided with a pair of protrusions 33 on a lower side thereof. The protrusions 33 are received in corresponding recessed portions 34 provided in a lower side of the frame 18 to locate the vessel 16 relative to the frame 18.

The lower portion 20 of the base 12 comprises generally a dome shaped member having a lower edge 37 that rests on a horizontal surface. The support members 22 extend upwardly from the lower portion 20 and each comprise a curved wait member 23. The curved, wall members 23 are complementary in shape to the shape of the frame 18 and the recesses 24 are located centrally on the wall members 23.

The vessel 16 includes an opening 40 from which liquid heated in the vessel 16 can be poured. The opening 40 is provided in the body 14 at a location generally between the lugs 30. That is, the opening 40 is provided adjacent a centre line 52 of the vessel 16, the centre line 52 being a line around the vessel on a plane perpendicular to the rotation axis 50 midway between the lugs 30. When the vessel 16 and frame 18 are received by the base 12, the opening is located generally uppermost (as shown in FIG. 1) and the kettle 10 is operated in this position to heat water within the vessel 16.

The opening 40 is also provided with a spout 42 surrounding the opening 40. The spout 42 is provided such that when the body 12 is rotated about the cylindrical protrusions 26, the spout 42 aids the pouring of wafer downwardly into a rang or cup located adjacent the base 12. The spout 42 comprises a first side wall 43 located on one side of the centre line 52 and a second side wall 44 located on an opposite side of the centre line 52. The first and second walls 43 and 44 meet at the centre line 52 on a side of the opening 40 and taper downwardly in height as the walls 43 and 44 extend away from each other along each side of the opening 40.

The vessel 16 is also provided with a handle 46. The handle 46 extends outwardly from the vessel 16 on the centre line 52 of the body 14 on a side of the opening 40 opposite the spout 42. The handle 46 is curved in shape, curving away from a radial line extending from the rotational axis 50.

The opening 40 also preferably includes a cover member 48 having a sieve portion for straining water passing in and out of the opening 40.

The base 12 includes a cut out portion 54 on a portion of the lower edge 37 below the spout 42 such that the lower edge 37 is located above the surface on which the base 12 is resting. The cut out portion 54 thereby provides an opening into which an edge of a saucer can be received (as shown in FIG. 1). This allows a cup resting on a saucer to be placed closer to the kettle 10.

Also, the vessel 16 of the kettle 10 may include a transparent window 56 such that the level of water within the vessel 16 can be viewed. The window 56 is provided under the spout along the centre line 52. The frame 18 includes a cut away portion 57 adjacent the window 56 such that the window 56 can be viewed while the vessel 16 is in the frame 18.

Figure 4:
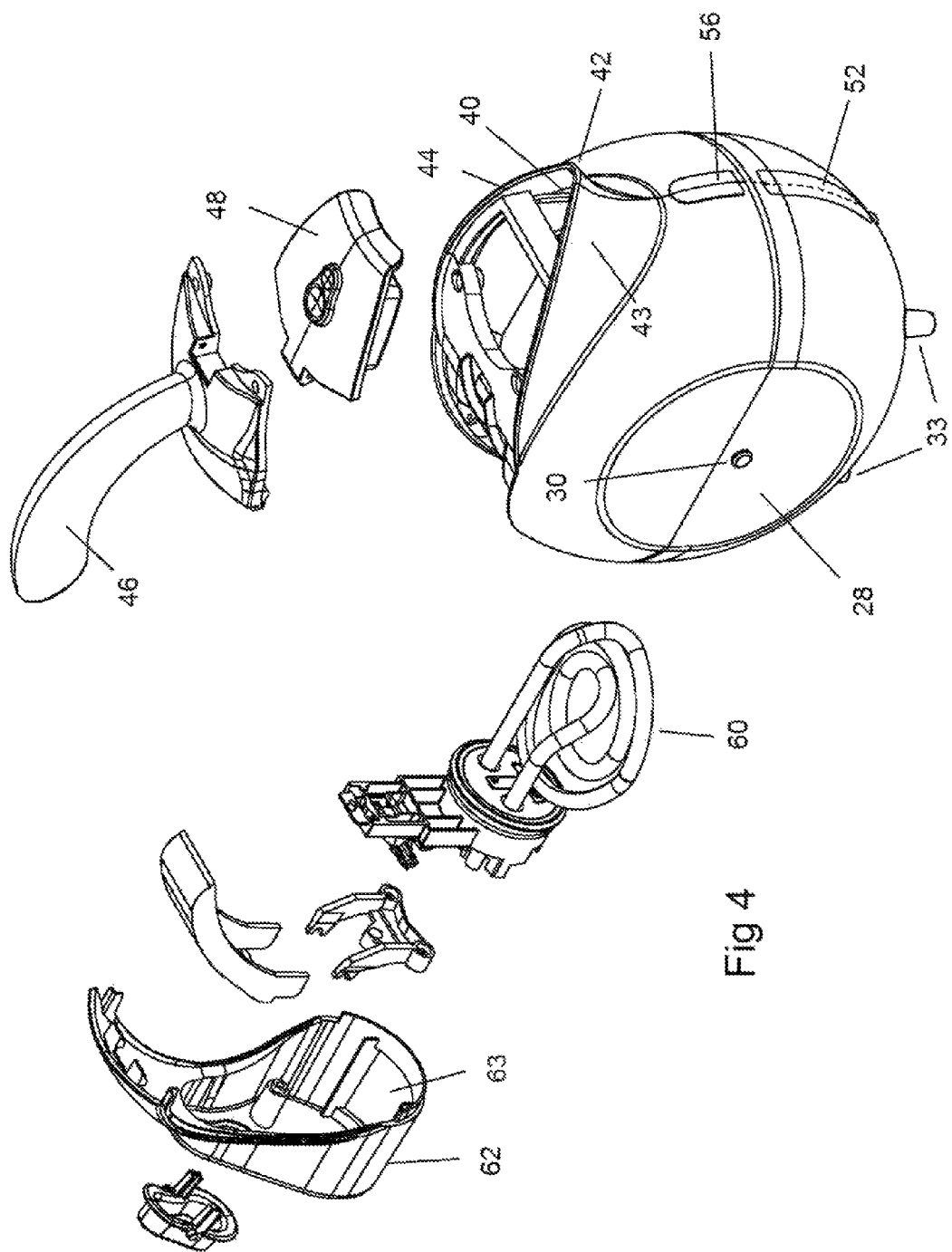
FIG. 4 is an exploded view of the vessel of the kettle of FIG. 1.
Figure 5:
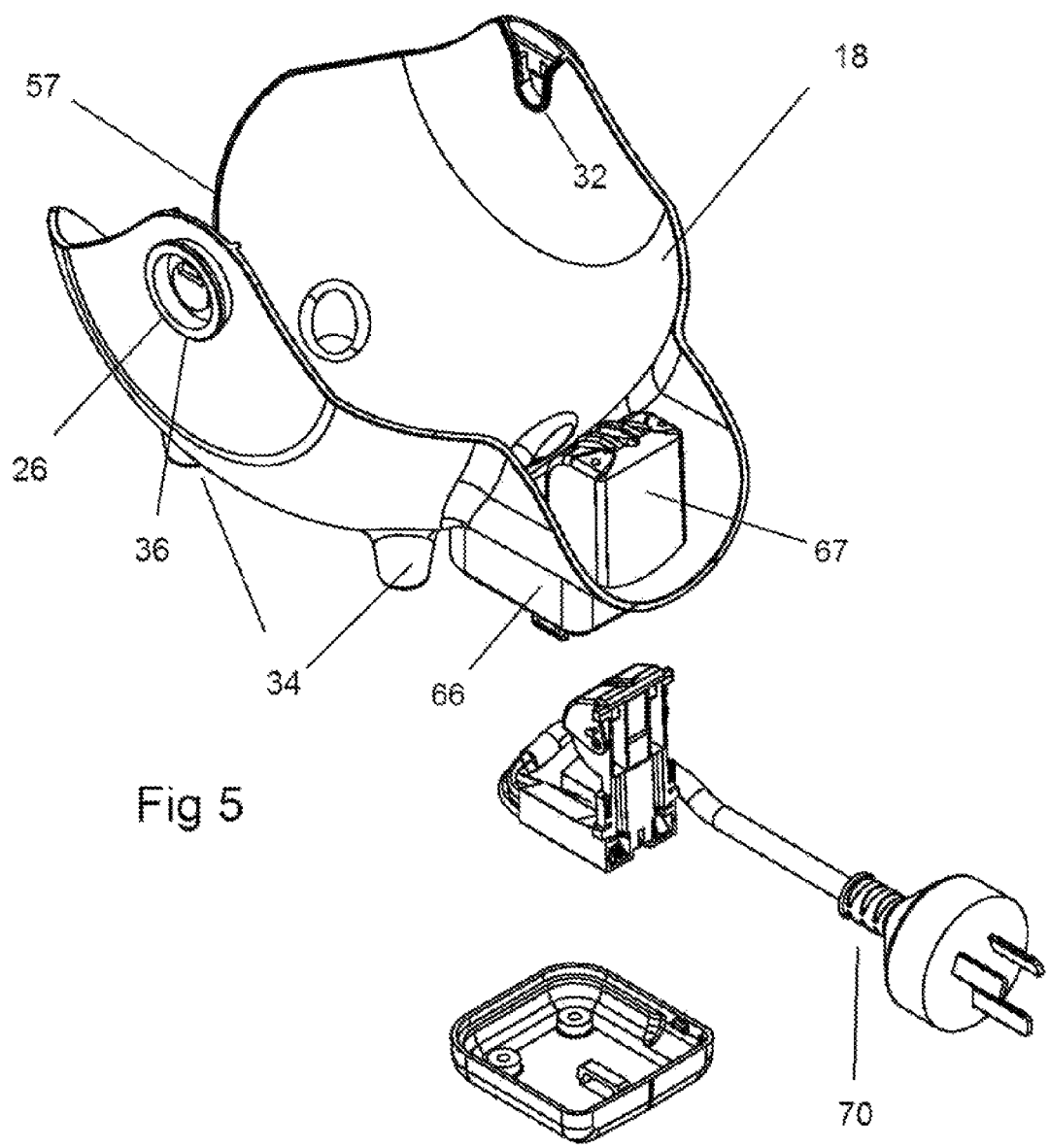
FIG. 5 is an exploded view of the frame of the kettle of FIG. 1.
Figure 6:
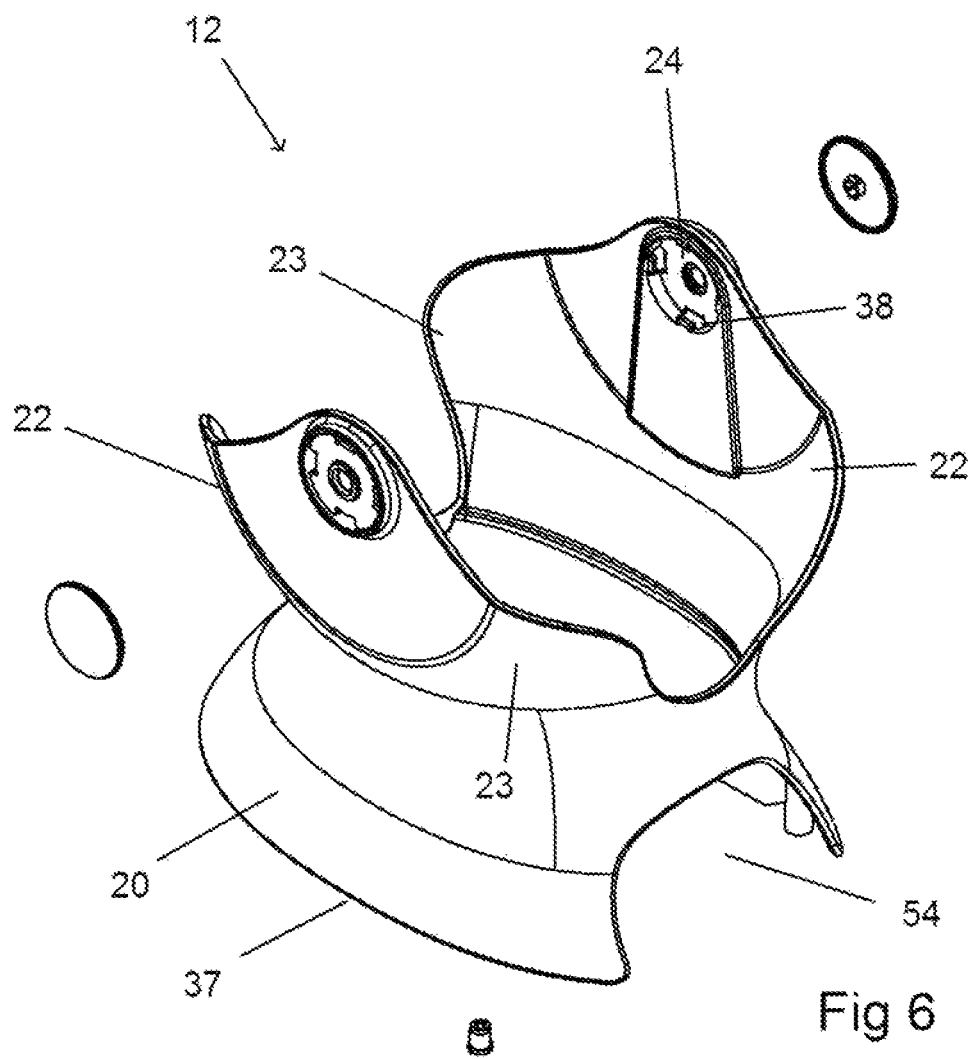
FIG. 6 is an exploded view of the base of the kettle of FIG. 1.

The frame 18 is provided with a first electrical housing 66. The first electrical housing 66 includes first contacts in connection with a power source via a power cord 70. The vessel 16 is provided with a second electrical housing 62 provided on the vessel 16 on a side thereof generally opposite the spout 42. The second electrical housing 62 is provided with second contacts in connection with an internal element 60 (as shown in FIG. 4) for heating water within the vessel.

The first electrical housing 66 includes a projecting portion 67 which is arranged to be received in an opening 63 in the second electrical housing 62 when the vessel 16 is received in the frame 18. When the projecting portion 67 of the first electrical housing 66 is received in the opening 63 of the second electrical housing 62, the first contacts engage with the second contacts. Therefore, placing the vessel 16 into the frame 18 provides an electrical connection to power the heating element 60.

Figure 2:
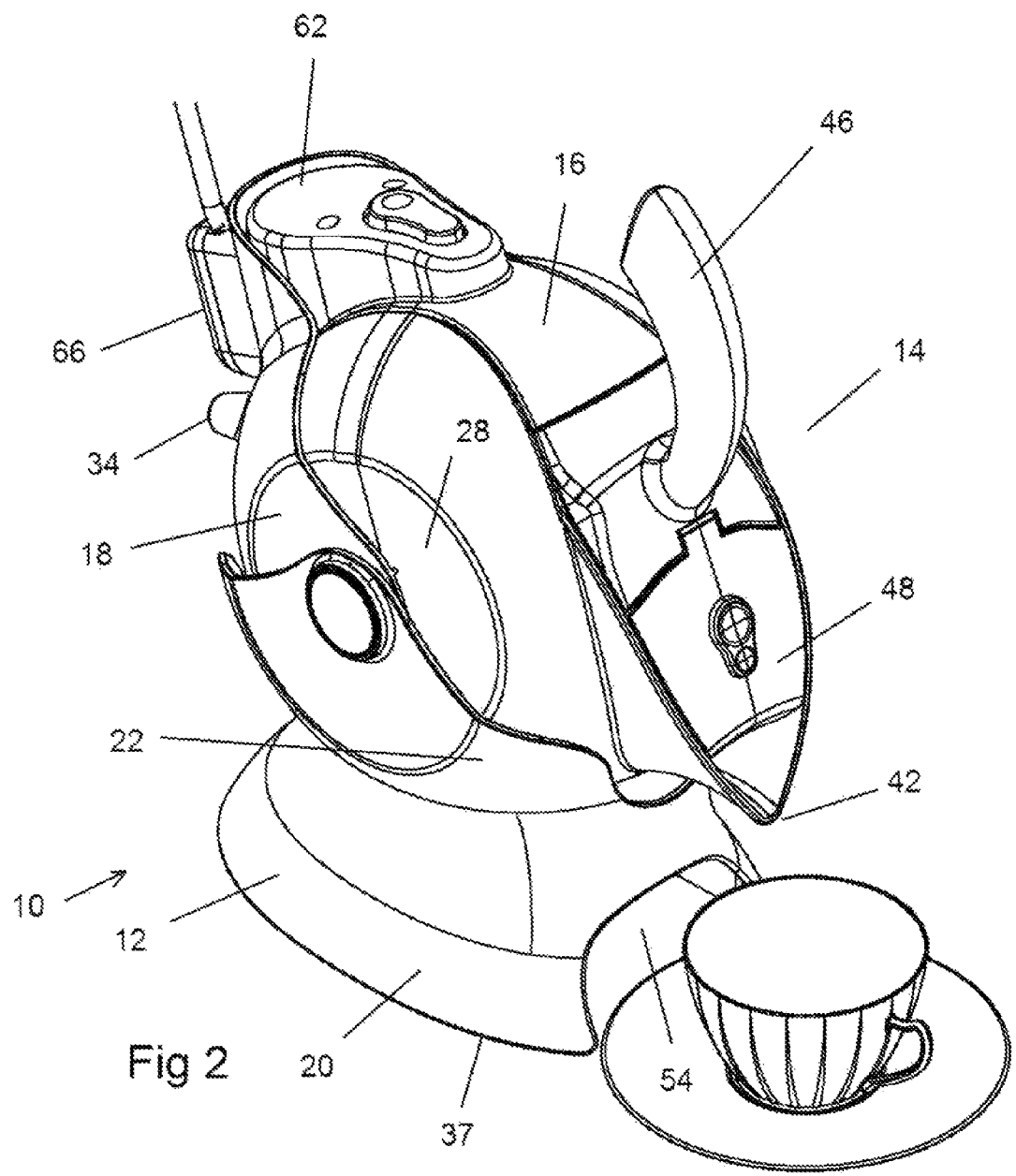
FIG. 2 is an upper perspective view of the kettle of FIG. 1 with the body pivoted to pour liquid into a cup.
Figure 3:
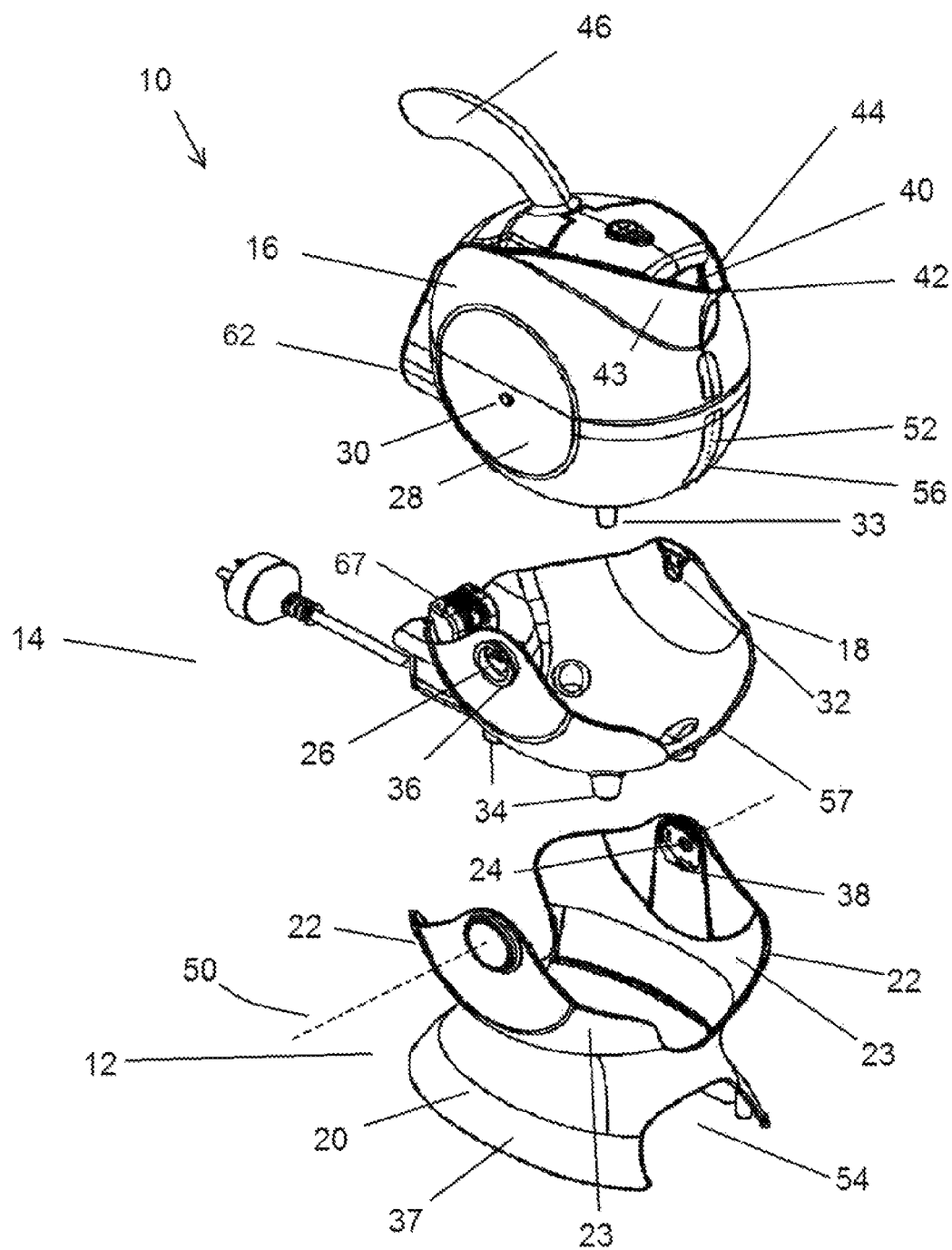
FIG. 3 is an exploded view of the kettle of FIG. 1.

In use, the kettle 10 can be filled by lifting the vessel 16 from the frame 18 and filling in the usual manner. The vessel 16 is placed back in the frame 18 to allow water within the vessel 16 to be heated by the element 60. When the water has boiled, a cup can be filled by placing it alongside the base 12 below the spout 42. The vessel 16 and frame 18 are then rotated about the rotational axis 50 so that the spout 42 moves downwardly towards the cup (as shown in FIG. 2). Water can then be poured from the spout 42 into the cup.

It will be readily apparent to persons skilled in the relevant arts that various modifications and improvements may be made to the foregoing embodiments, in addition to those already described, without departing from the basic inventive concepts of the present invention.

What is claimed is:

1. A kettle comprising:
   a base;
   a frame pivotally mounted relative to the base, the frame including first electrical contacts connectable to a power source;
   a vessel receivable in and removable from the frame, the vessel including an internal element in connection with second electrical contacts; and
   an opening in the vessel from which liquid can be poured;
   wherein when the vessel is received in the frame the first electrical contacts make connection with the second electrical contacts such that power is supplied to the internal element to heat water within the vessel and pivoting of the vessel and frame relative to the base allows pouring of liquid from the opening.

2. A kettle in accordance with claim 1, wherein the vessel is removable from the frame by lifting the vessel upwardly.

3. A kettle in accordance with claim 1, wherein the base includes a pair of support members extending upwardly from a lower portion thereof, the support members being engaged with opposed sides of the frame such that the frame is rotatable about the base about a horizontal axis of rotation.

4. A kettle in accordance with claim 3, wherein each support member includes a recess on a side thereof adjacent the other support member and the frame includes a pair of cylindrical protrusions on opposite sides thereof such that the cylindrical protrusions are received in the recesses in the support members.

5. A kettle in accordance with claim 4, wherein the cylindrical protrusions each include a peripheral rim to engage in a snap fit manner with lugs within the recesses to retain the protrusions within the recesses such that the cylindrical protrusions are rotatable within the recesses.

6. A kettle in accordance with claim 3, wherein side surfaces of the vessel include lugs that are received downwardly into slots provided on opposed inner surfaces of the frame such that the vessel can be inserted downwardly into the frame.

7. A kettle in accordance with claim 6, wherein the slots are located on the frame such that when the lugs are received in the slots, the lugs are located generally on the axis of rotation.

8. A kettle in accordance with claim 7, wherein the vessel comprises a curved wall defining an internal chamber into which water is received for heating and the frame is provided in a shape that is complementary in shape to the lower half of the vessel such that a portion of the vessel is received in the frame.

9. A kettle in accordance with claim 8, wherein the shape of the curved wall is generally an oblate spheroid having a central symmetry axis located generally on the axis of rotation.

10. A kettle in accordance claim 3, wherein the lower portion of the base comprises generally a dome shaped member having a lower edge that rests on a horizontal surface and the support members extend upwardly from the lower portion and each comprise a curved wall member.

11. A kettle in accordance with claim 10, wherein the lower edge includes a cut out portion below the opening such that the lower edge is located above the surface on which the base is resting to provide an opening into which an edge of a saucer can be received.

12. A kettle in accordance with claim 6, wherein the opening is provided adjacent a centre line of the vessel, the centre line being a line around the vessel on a plane perpendicular to the rotation axis midway between the lugs.

13. A kettle in accordance with claim 12, wherein the opening is provided with a spout such that when the vessel is rotated about the rotation axis, the spout aids the pouring of water downwardly into a mug or cup located adjacent the base.

14. A kettle in accordance with claim 13, wherein the spout comprises a first side wall located on one side of the centre line and a second side wall located on an opposite side of the centre line, the first and second walls meeting at the centre line on a side of the opening and tapering downwardly in height as the walls extend away from each other along each side of the opening.

15. A kettle in accordance with claim 12, wherein the vessel is provided with a handle extending outwardly from the vessel on the centre line of the body on a side of the opening opposite the spout.

16. A kettle in accordance with claim 15, wherein the handle is curved in shape, curving away from a radial line extending from the rotational axis.

17. A kettle in accordance with claim 1, wherein the first electrical contact is provided in a first electrical housing on the frame and the second electrical contact is provided in a second electrical housing on the vessel.

18. A kettle in accordance with claim 17, wherein the first electrical housing includes a projecting portion which is arranged to he received in an opening in the second electrical housing when the vessel is received in the frame such that the first electrical contacts engage with the second contacts.

19. A kettle in accordance with claim 1, wherein the vessel includes a transparent window such that the level of water within the vessel can be viewed.

20. A kettle in accordance with claim 19, wherein the window is provided under the spout along the centre line.

21. A kettle in accordance with claim 17, wherein a power cord is provided extending into the first electrical housing on the frame to provide power to the first electrical contact.

* * * * *